United States Patent
Chiang et al.

(10) Patent No.: US 8,214,550 B2
(45) Date of Patent: Jul. 3, 2012

(54) METHOD FOR CONTROLLING ICON DISPLAY CORRESPONDING TO A USB MASS STORAGE, ASSOCIATED PERSONAL COMPUTER, AND STORAGE MEDIUM STORING AN ASSOCIATED USB MASS STORAGE DRIVER

(75) Inventors: Chang-Hao Chiang, Hsinchu (TW); Jen-Hung Liao, Taichung (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 361 days.

(21) Appl. No.: 12/408,712

(22) Filed: Mar. 22, 2009

(65) Prior Publication Data

US 2010/0241768 A1    Sep. 23, 2010

(51) Int. Cl.
*G06F 3/00* (2006.01)
(52) U.S. Cl. ......... 710/16; 710/15; 710/17; 710/18; 710/19; 710/300; 710/301; 710/302; 711/115
(58) Field of Classification Search .................. None
See application file for complete search history.

(56) References Cited

U.S. PATENT DOCUMENTS

| | | | |
|---|---|---|---|
| 6,557,754 B2 * | 5/2003 | Gray et al. | 235/375 |
| 7,014,121 B2 * | 3/2006 | Chang et al. | 235/492 |
| 7,383,386 B1 * | 6/2008 | Iyer et al. | 711/115 |
| 2004/0221130 A1 * | 11/2004 | Lai et al. | 711/203 |
| 2005/0045721 A1 * | 3/2005 | Wang et al. | 235/440 |
| 2005/0156037 A1 * | 7/2005 | Wurzburg | 235/441 |
| 2006/0006233 A1 * | 1/2006 | Chang et al. | 235/441 |
| 2006/0015676 A1 * | 1/2006 | Oribe et al. | 711/103 |
| 2006/0285559 A1 * | 12/2006 | Cheng | 370/522 |
| 2007/0233973 A1 * | 10/2007 | Uno | 711/154 |
| 2008/0103658 A1 * | 5/2008 | Boac et al. | 701/36 |
| 2008/0177922 A1 * | 7/2008 | Chow et al. | 710/302 |
| 2010/0161841 A1 * | 6/2010 | Akagi et al. | 710/17 |

FOREIGN PATENT DOCUMENTS

| | | | |
|---|---|---|---|
| JP | 11266384 A | * | 9/1999 |
| JP | 2005176273 A | * | 6/2005 |

OTHER PUBLICATIONS

'Designing Hardware for Surprise Removal under Windows XP' Draft Version 0.8—Aug. 1, 2001, by Microsoft Corporation.*
OSR Online Lists "Avoiding 'Unsafe Removal of Device' Dialog on Win2K", Copyright © 2005, OSR Open Systems Resourcs, Inc.*

(Continued)

Primary Examiner — Steven Snyder
(74) Attorney, Agent, or Firm — Winston Hsu; Scott Margo

(57) ABSTRACT

A method for controlling icon display corresponding to a Universal Serial Bus (USB) Mass Storage is provided. The USB Mass Storage is electrically connected to a USB port of a personal computer. The method includes: when it is detected that there is nothing inserted into any memory card slot of the USB Mass Storage, preventing the USB Mass Storage from triggering a specific icon to be displayed, wherein the specific icon is selectively utilized for indicating that at least one USB device is electrically connected to the personal computer; and when it is detected that a memory card is inserted into any of at least one memory card slot of the USB Mass Storage, allowing the specific icon to be displayed. An associated personal computer and a storage medium storing an associated USB Mass Storage driver for controlling icon display corresponding to the USB Mass Storage are further provided.

19 Claims, 8 Drawing Sheets

OTHER PUBLICATIONS

Microsoft Support Article ID: 298504—Revision: 4.1 "How to avoid the "Unsafe Removal" dialog box", Last Review: Aug. 22, 2005.*

"Writing Device Drivers: Tutorial," copyright, Digital Equipment Corporation 1996, Chapter 2.*

'Device Driver' article from Wikipedia.org, Oct. 17, 2007.*

"Cypress USB 2.0 Mass Storage Device Driver for Windows," Mar. 4, 2011, by Samir Joshi, copyright Cypress Semiconductor Corporation.*

'Ghacks Christmas Giveaway: USB Safely Remove' by ghacks.net, published on Dec. 15, 2008.*

* cited by examiner

METHOD FOR CONTROLLING ICON DISPLAY CORRESPONDING TO A USB MASS STORAGE, ASSOCIATED PERSONAL COMPUTER, AND STORAGE MEDIUM STORING AN ASSOCIATED USB MASS STORAGE DRIVER

BACKGROUND OF THE INVENTION

1. Field of the Invention

The present invention relates to Universal Serial Bus (USB) Mass Storage control, and more particularly, to a method for controlling icon display corresponding to a USB Mass Storage, an associated personal computer, and a storage medium storing an associated USB Mass Storage driver.

2. Description of the Prior Art

When a USB Mass Storage such as a card reader is electronically connected to a host device such as a personal computer, the host device typically continues to display at least one icon representing the connection relationship between the card reader and the host device. In a situation where the card reader is kept idle for a long period with nothing inserted into any memory card slot of the card reader, the host device still continues to display the icon. This typically makes some users feel confused. Thus, a novel method is required for preventing unnecessary icon display triggered by the USB Mass Storage.

SUMMARY OF THE INVENTION

It is therefore an objective of the present invention to provide a method for controlling icon display corresponding to a Universal Serial Bus (USB) Mass Storage, to provide an associated personal computer, and to provide a storage medium storing an associated USB Mass Storage driver, in order to prevent the unnecessary icon display triggered by the USB Mass Storage.

According to an embodiment of the present invention, a method for controlling icon display corresponding to a USB Mass Storage is provided. The USB Mass Storage is electrically connected to a USB port of a personal computer. The method comprises: detecting any memory card insertion into the USB Mass Storage; and when it is detected that there is nothing inserted into any memory card slot of the USB Mass Storage, preventing the USB Mass Storage from triggering a specific icon to be displayed, wherein the specific icon is selectively utilized for indicating that at least one USB device is electrically connected to the personal computer. In particular, when it is detected that a memory card is inserted into any memory card slot of the USB Mass Storage, allowing the specific icon to be displayed.

According to an embodiment of the present invention, an associated personal computer is further provided. The personal computer comprises a storage medium storing a USB Mass Storage driver for controlling icon display corresponding to a USB Mass Storage. The USB Mass Storage is electrically connected to a USB port of the personal computer. When the USB Mass Storage driver is executed by the personal computer, the personal computer operates according to a method comprising: detecting any memory card insertion into the USB Mass Storage; and when it is detected that there is nothing inserted into any memory card slot of the USB Mass Storage, preventing the USB Mass Storage from triggering a specific icon to be displayed, wherein the specific icon is selectively utilized for indicating that at least one USB device is electrically connected to the personal computer. In particular, when it is detected that a memory card is inserted into any memory card slot of the USB Mass Storage, allowing the specific icon to be displayed.

In addition, a storage medium storing an associated USB Mass Storage driver is provided accordingly. The USB Mass Storage driver is utilized for controlling icon display corresponding to a USB Mass Storage. The USB Mass Storage is electrically connected to a USB port of a personal computer. When the USB Mass Storage driver is executed by the personal computer, the personal computer operates according to a method comprising: detecting any memory card insertion into the USB Mass Storage; and when it is detected that there is nothing inserted into any memory card slot of the USB Mass Storage, preventing the USB Mass Storage from triggering a specific icon to be displayed, wherein the specific icon is selectively utilized for indicating that at least one USB device is electrically connected to the personal computer. In particular, when it is detected that a memory card is inserted into any memory card slot of the USB Mass Storage, allowing the specific icon to be displayed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
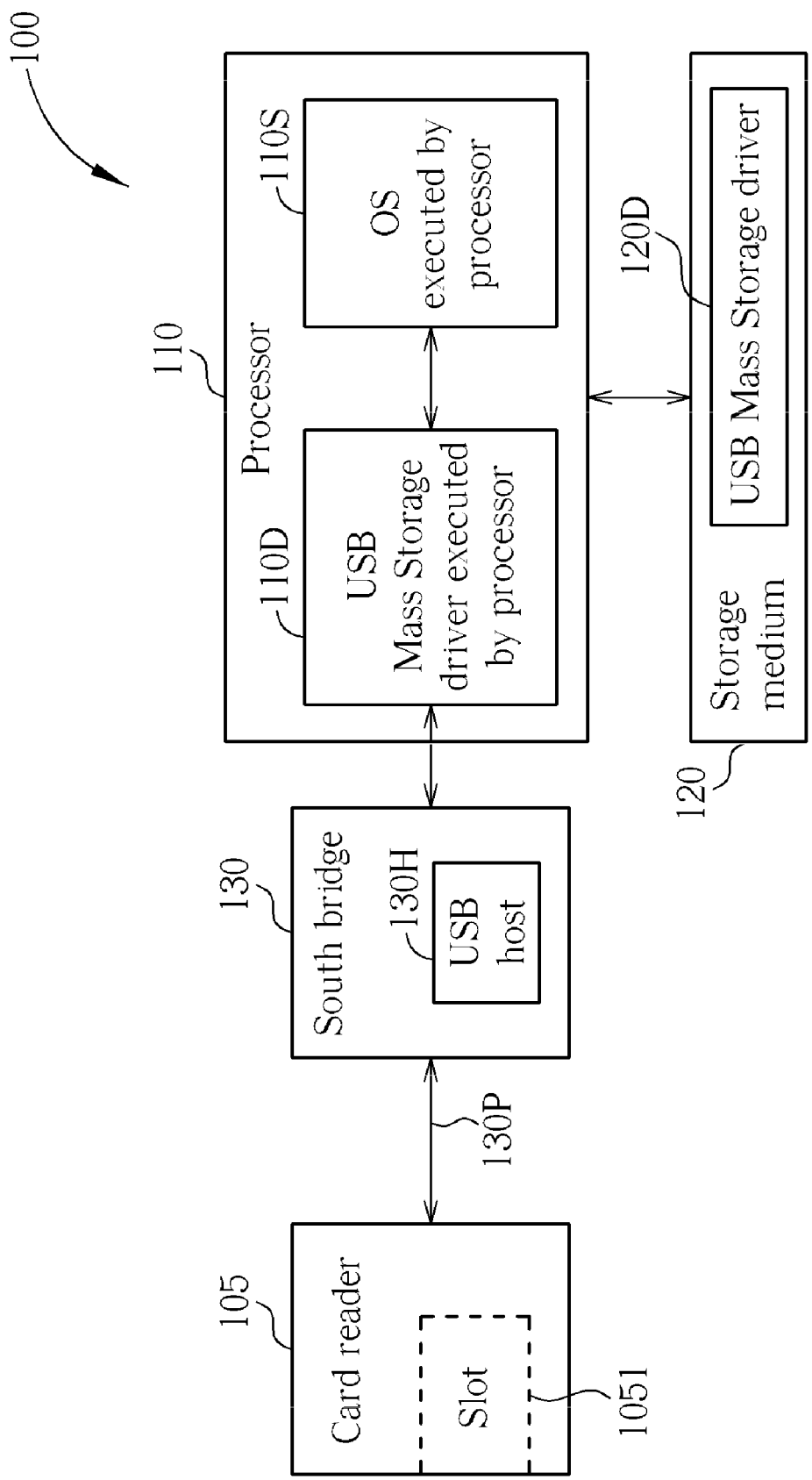
FIG. 1 is a diagram of a personal computer according to a first embodiment of the present invention.

FIG. 1 is a diagram of a personal computer 100 according to a first embodiment of the present invention. For example, the personal computer 100 is a laptop computer. In another example, the personal computer 100 is a desktop computer. As shown in FIG. 1, the personal computer 100 comprises a processor 110, a storage medium 120, a south bridge 130 comprising at least one Universal Serial Bus (USB) host 130H, and a USB Mass Storage electronically connected to a USB port 130P of the personal computer 100, where the USB Mass Storage of this embodiment is a card reader 105 comprising a first memory card slot 1051 (labeled "Slot" in FIG. 1). The storage medium 120 stores a USB Mass Storage driver 120D for controlling icon display corresponding to the USB Mass Storage, which is the card reader 105 in this embodiment.

The notation 110D is utilized for representing the USB Mass Storage driver 120D read and executed by the personal computer 100, and more particularly, by the processor 110. In addition, the notation 110S is utilized for representing an operating system (OS) executed by the personal computer 100, and more particularly, by the processor 110.

According to this embodiment, the storage medium 120 represents a hard disk (HD). This is for illustrative purposes only, and is not meant to be a limitation of the present invention. According to a variation of this embodiment, the storage medium 120 represents an optical disc accessed by an optical disc drive of the personal computer 100 of this variation. For example, the optical disc can be a Compact Disc-Read Only Memory (CD-ROM) or a CD-Recordable (CD-R). In another example, the optical disc can be a Digital Versatile Disc (DVD) such as a DVD-ROM, a DVD-Recordable (DVD-R) disc, or a DVD+R disc.

According to another variation of this embodiment, the storage medium 120 represents a non-volatile (NV) memory. For example, the storage medium 120 can be a Basic Input Output System (BIOS) ROM. According to another variation of this embodiment, the storage medium 120 represents a non-volatile (NV) memory accessed by an associated interface circuit of the personal computer 100 of this variation. For example, the interface circuit is a Solid State Drive (SDD), and the storage medium 120 is a Flash memory of the SDD. According to another variation of this embodiment, the USB Mass Storage driver 120D can be stored in a storage medium of a portable storage device such as a memory card or a USB flash disk, where the storage medium of this variation is a Flash memory.

Figure 2:
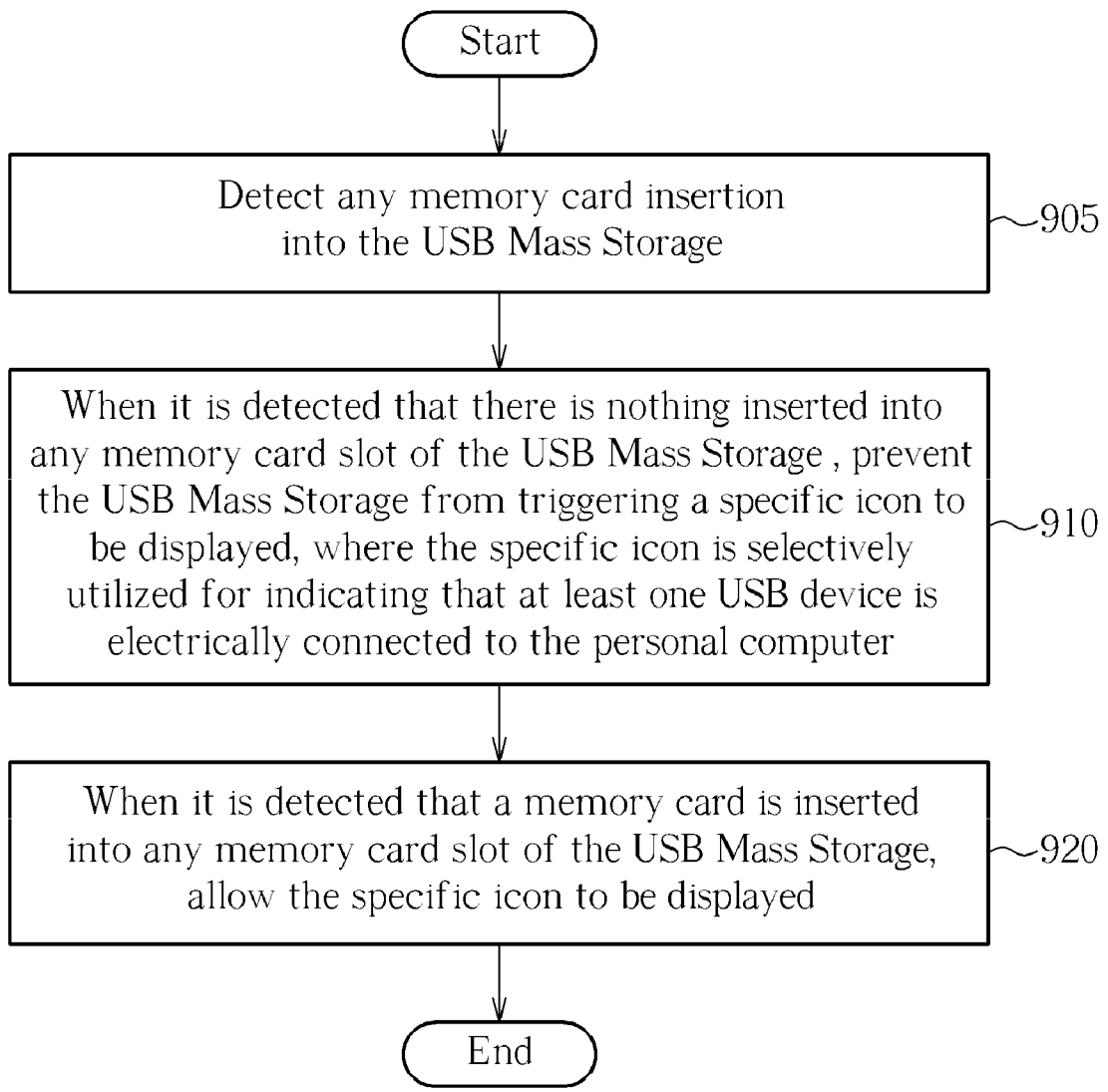
FIG. 2 illustrates a flowchart of a method for controlling icon display corresponding to a Universal Serial Bus (USB) Mass Storage according to an embodiment of the present invention.

FIG. 2 illustrates a flowchart of a method for controlling icon display corresponding to a USB Mass Storage according to an embodiment of the present invention. The method shown in FIG. 2 can be applied to the personal computer 100 shown in FIG. 1. In addition, the method shown in FIG. 2 can be implemented by utilizing the personal computer 100 shown in FIG. 1. More particularly, when the USB Mass Storage driver 120D is executed by the personal computer 100, the personal computer 100 operates according to the method shown in FIG. 2, where the method is described as follows.

In Step 905, detect any memory card insertion into the USB Mass Storage (i.e. the card reader 105 in this embodiment).

In Step 910, when it is detected that there is nothing inserted into any memory card slot of the USB Mass Storage (i.e. the card reader 105 in this embodiment), the USB Mass Storage driver 110D (labeled "USB Mass Storage driver executed by processor" in FIG. 1) prevents the USB Mass Storage from triggering a specific icon to be displayed, where the specific icon is selectively utilized for indicating that at least one USB device is electrically connected to the personal computer 100.

In Step 920, when it is detected that a memory card is inserted into any memory card slot of the USB Mass Storage (i.e. the card reader 105 in this embodiment), the USB Mass Storage driver 110D (labeled "USB Mass Storage driver executed by processor" in FIG. 1) allows the specific icon to be displayed.

Please note that, in a situation where the USB Mass Storage is the only USB device electrically connected to the south bridge 130 of the personal computer 100, the specific icon is not displayed as long as it is detected that there is nothing inserted into any memory card slot of the USB Mass Storage. As a result, by utilizing the USB Mass Storage driver implemented according to the method shown in FIG. 2, the user will not encounter the related art problem of unnecessary icon display.

However, in a situation where another USB device such as a second USB device that does not have any memory card slot (e.g. a conventional USB gamepad, a conventional USB keyboard, or a conventional USB mouse) is electrically connected to the south bridge 130 of the personal computer 100, although the USB Mass Storage driver 110D can prevent the USB Mass Storage from triggering the specific icon to be displayed, the USB Mass Storage driver 110D does not prevent the second USB device from triggering the specific icon to be displayed.

More particularly, the specific icon is typically displayed due to the USB connection between the south bridge 130 and the second USB device. In practice, when the specific icon is displayed on a screen, the specific icon is typically displayed at the bottom-right of the screen.

Figure 3:
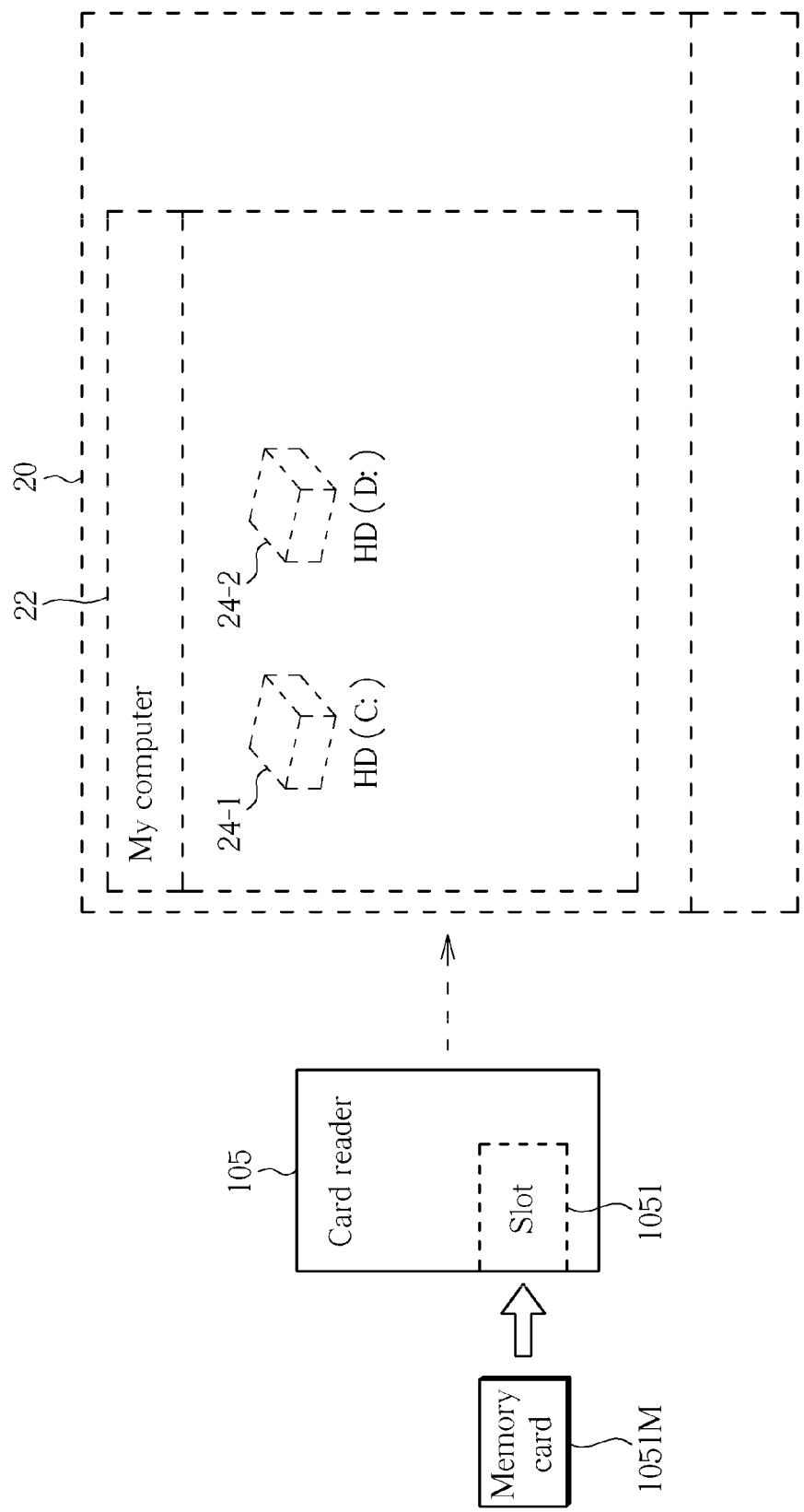
FIG. 3 and FIG. 4 illustrate icon display transition according to an embodiment of the present invention, where this embodiment is a variation of the embodiment shown in FIG. 2.
Figure 4:
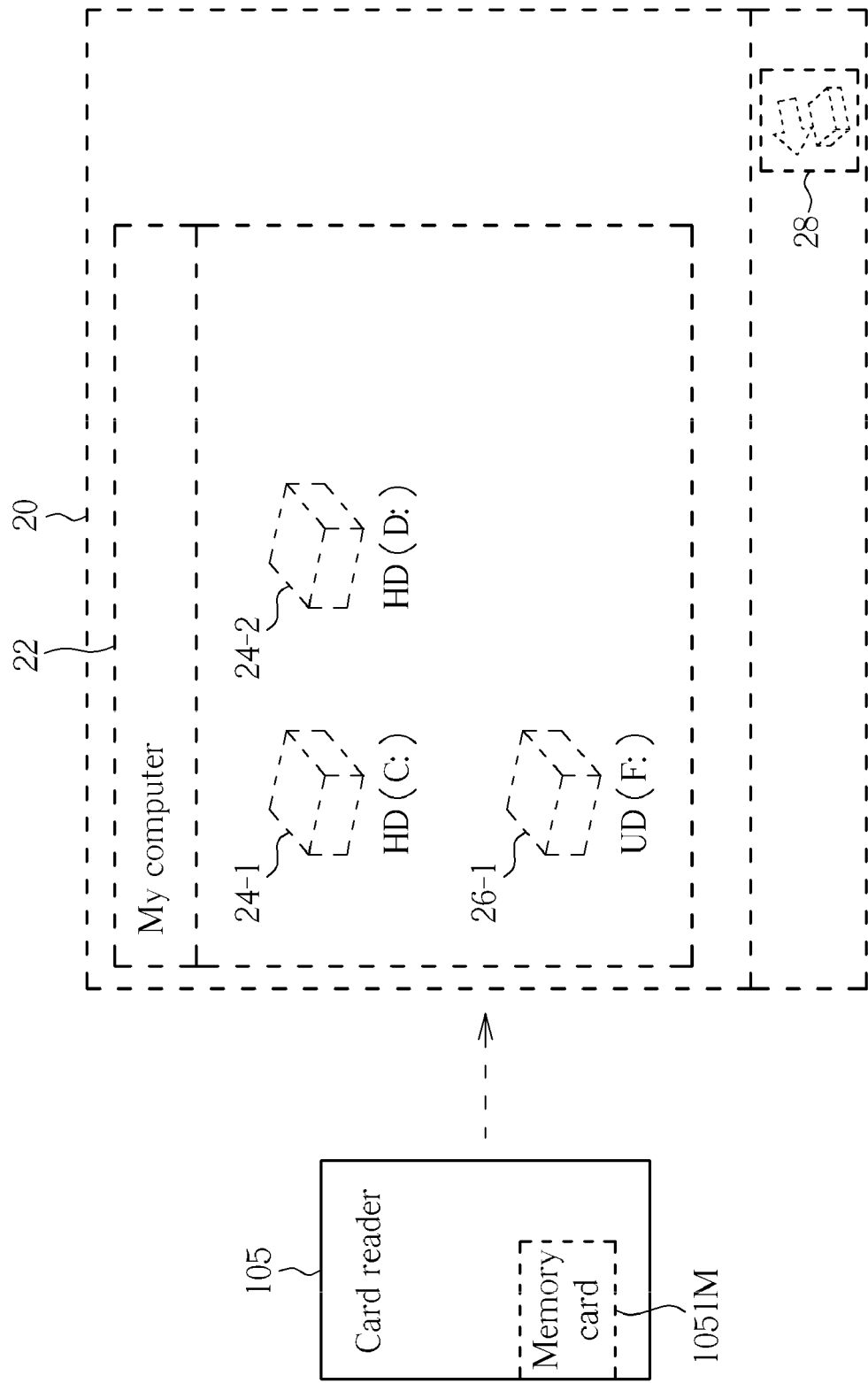

FIG. 3 and FIG. 4 illustrate icon display transition according to an embodiment of the present invention, where this embodiment is a variation of the embodiment shown in FIG. 2.

More particularly, FIG. 3 illustrates a situation where the USB Mass Storage (i.e. the card reader 105 in this embodiment) is the only USB device coupled to the USB host 130H, where the aforementioned specific icon (e.g. the specific icon 28 shown in FIG. 4) is not displayed on the screen 20. The personal computer 100 may comprise the screen 20 for displaying any information to users. When the user clicks (or double-clicks) an icon representing "My Computer", a window 22 (labeled "My Computer" in the heading area thereof in FIG. 3) is utilized for displaying icons of a plurality of hard disks (HDs) 24-1 and 24-2 (labeled "HD (C:)" and "HD (D:)" in FIG. 3, respectively). When the card reader 105 detects that there is nothing inserted into the first memory card slot 1051, the USB Mass Storage driver 110D (labeled "USB Mass Storage driver executed by processor" in FIG. 1) prevents the USB Mass Storage from triggering a first icon (e.g. the first icon 26-1 shown in FIG. 4) to be displayed, where the first icon represents the card reader 105. The USB Mass Storage driver 110D blocks the notifying signal sent from the card reader 105 to the OS 110S, thereby the OS 110S does not know that the card reader 105 has been coupled to the USB host 130H. That is, when nothing is inserted into the first memory card slot 1051, there is no icon representing the card reader 105, and more particularly, there is no icon representing the first memory card slot 1051, within the window 22.

In addition, referring to FIG. 4, the OS 110S periodically sends a test unit ready command to the card reader 105 for inquiring any memory card insertion. When the card reader 105 detects that a memory card 1051M is inserted into the first memory card slot 1051, the USB Mass Storage driver 110D passes the notifying signal sent from the card reader 105 to the OS 110S and allows the first icon 26-1 (labeled "UD (F:)" in FIG. 4) to be displayed. Please note that the specific icon 28 is displayed at the bottom-right of the screen 20.

According to this embodiment, in a situation where another USB device such as the second USB device mentioned above is electrically connected to the south bridge 130, the icon display shown in FIG. 3 is slightly changed, where the specific icon 28 is displayed at the bottom-right of the screen 20, and an additional icon representing the second USB device may be displayed in the window 22. In addition, the icon display can be the same as shown in FIG. 4 except for the additional icon of the second USB device. Similar descriptions for this situation are not repeated in detail here.

In practice, the USB Mass Storage driver 110D can skip installation of a Physical Device Object (PDO), in order to prevent the specific icon 28 and the first icon 26-1 from being displayed. According to this embodiment, when the USB Mass Storage is electrically connected to the south bridge 130, the USB Mass Storage driver 110D installs a Function Device Object (FDO), rather than installing the PDO at once.

Figure 5:
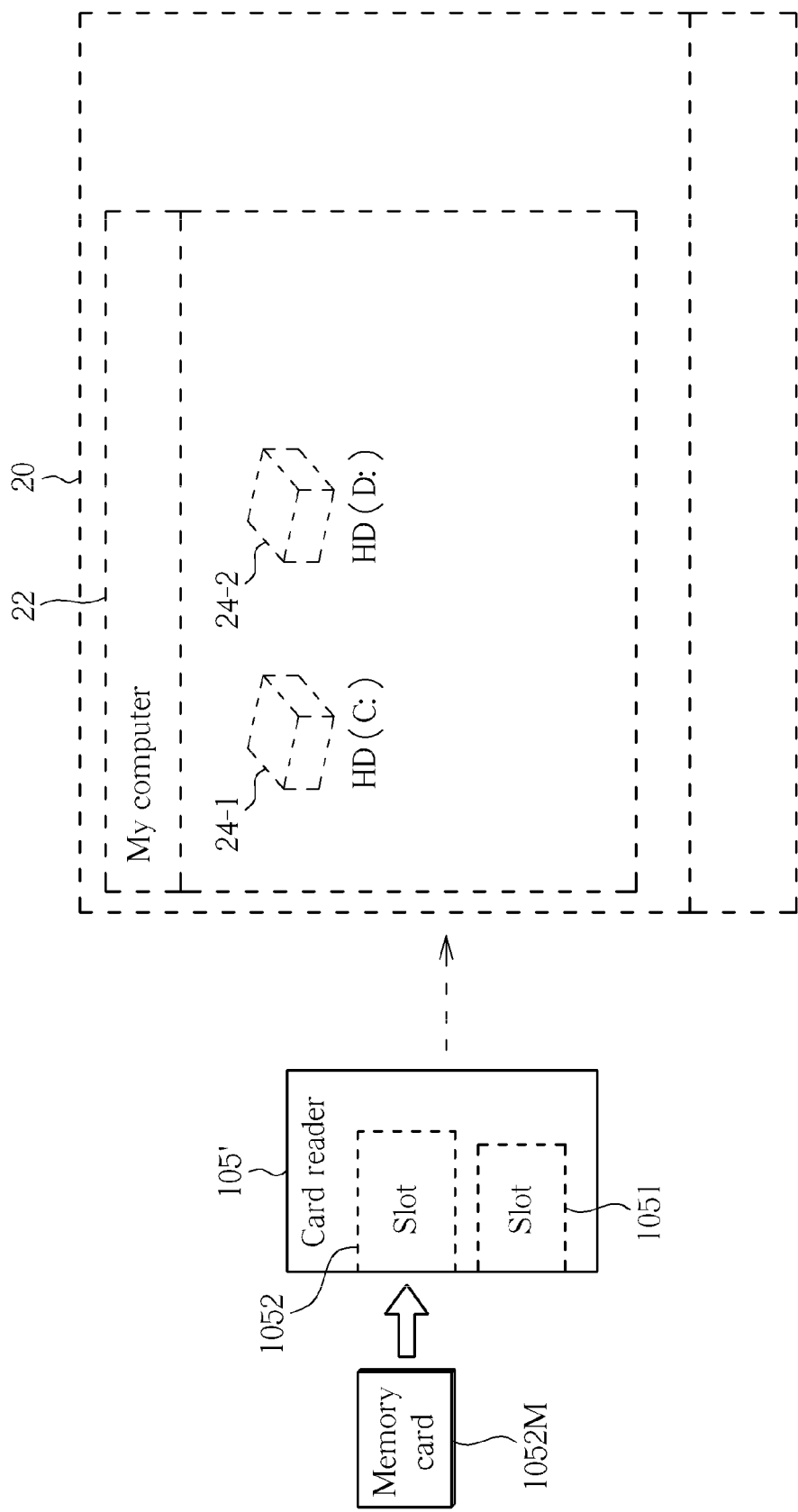
FIG. 5, FIG. 6 and FIG. 7 illustrate icon display transition according to an embodiment of the present invention, where this embodiment is another variation of the embodiment shown in FIG. 2.
Figure 6:
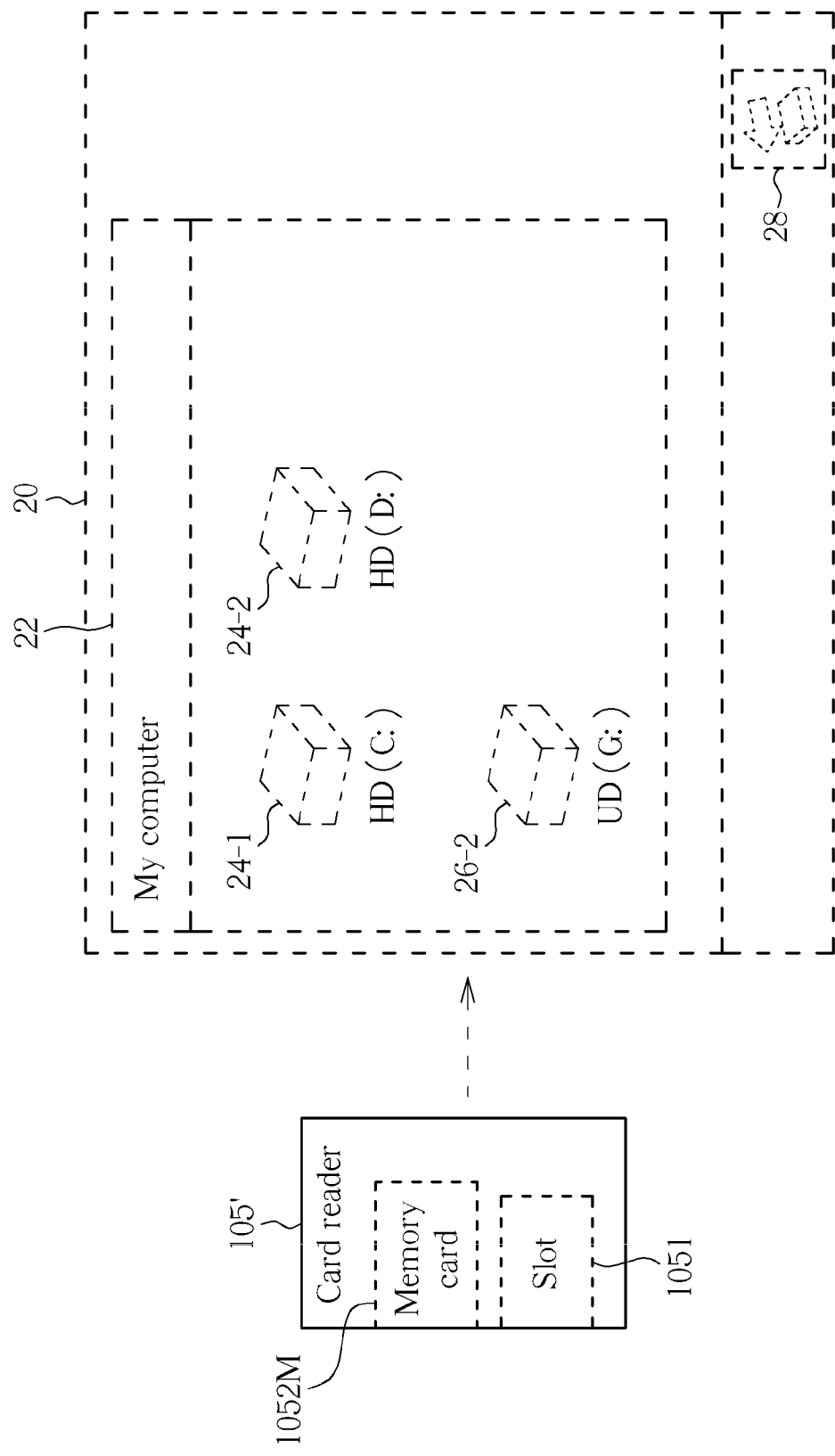
Figure 7:
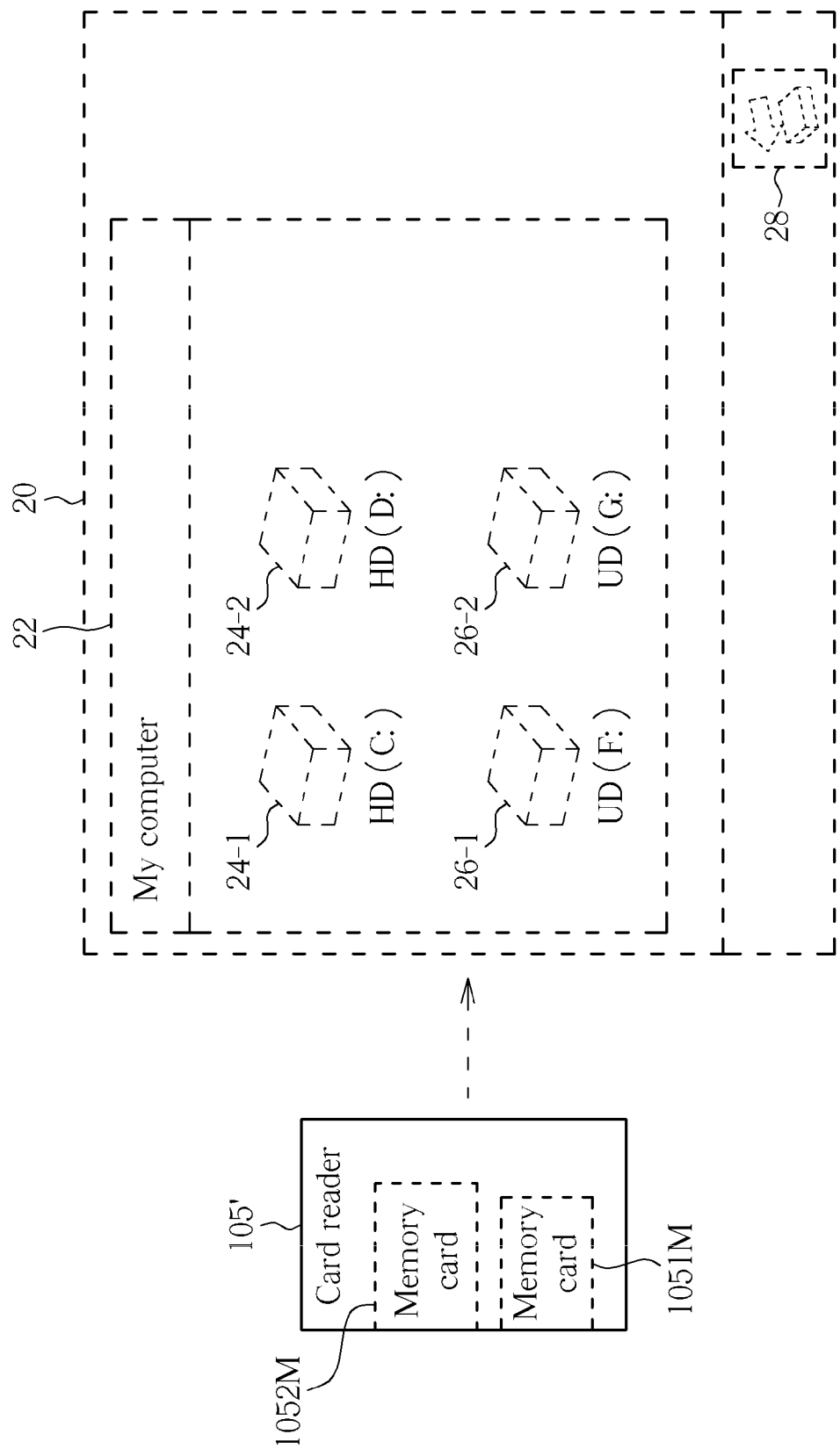

FIG. 5, FIG. 6 and FIG. 7 illustrate icon display transition according to an embodiment of the present invention, where this embodiment is another variation of the embodiment shown in FIG. 2, and is a variation of the embodiment shown in FIG. 3 and FIG. 4. In this embodiment, the USB Mass Storage comprises a plurality of memory card slots comprising the first memory card slot 1051 and a second memory card slot 1052 (labeled "Slot" in FIG. 5). Thus, the card reader 105 shown in FIG. 3 is replaced by the card reader 105' as shown in FIG. 5, FIG. 6 and FIG. 7.

More particularly, FIG. 5 illustrates a situation where the USB Mass Storage (i.e. the card reader 105' in this embodiment) is the only USB device electrically connected to the USB host 130H, where the aforementioned specific icon (e.g. the specific icon 28 shown in FIG. 6 and FIG. 7) is not displayed on the screen 20. When it is detected that there is nothing inserted into the second memory card slot 1052, the USB Mass Storage driver 110D prevents the USB Mass Storage from triggering a second icon (e.g. the second icon 26-2 shown in FIG. 6) to be displayed, where the second icon represents the card reader 105'. The USB Mass Storage driver 110D blocks the notifying signal sent from the card reader 105' to the OS 110S, thereby the OS 110S does not know that the card reader 105' has been coupled to the USB host 130H. That is, when nothing is inserted into the second memory card slot 1052, there is no icon representing the card reader 105', and more particularly, there is no icon representing the second memory card slot 1052, within the window 22.

In addition, referring to FIG. 6, the OS 110S periodically sends a test unit ready command to the card reader 105' for inquiring any memory card insertion. When the card reader 105' detects that a memory card 1052M is inserted into the second memory card slot 1052, the USB Mass Storage driver 110D passes the notifying signal sent from the card reader 105' to the OS 110S and allows the second icon 26-2 (labeled "UD (G:)" in FIG. 6) to be displayed. Please note that the specific icon 28 is displayed at the bottom-right of the screen 20.

Additionally, referring to FIG. 7, when it is detected that a memory card 1051M is inserted into the first memory card slot 1051, the USB Mass Storage driver 110D allows the first icon 26-1 (labeled "UD (F:)" in FIG. 7) to be displayed. As a result, the first icon 26-1 and the second icon 26-2 are all displayed in the window 22, where the specific icon 28 is displayed at the bottom-right of the screen 20.

According to this embodiment, in a situation where another USB device such as the second USB device mentioned above is electrically connected to the south bridge 130, the icon display shown in FIG. 5 is slightly changed, where the specific icon 28 is displayed at the bottom-right of the screen 20, and the additional icon representing the second USB device may be displayed in the window 22.

According to a variation of the embodiment shown in FIG. 5, FIG. 6 and FIG. 7, the memory card 1052M is replaced by a micro hard disk 1052M' (e.g. the so-called Microdrive), where the micro hard disk 1052M' is designed to fit in the second memory card slot 1052. For example, the second memory card slot 1052 of this variation complies with the Compact Flash (CF) Type II standards, while the first memory card slot 1051 of this variation complies with the Secure Digital (SD) standards. In other words, the standard of the memory card is not a limitation of the invention. Similar descriptions for this variation are not repeated in detail here.

According to another variation of the embodiment shown in FIG. 2, the USB Mass Storage is a digital camera, where the digital camera of this variation can operate in a USB Mass Storage mode according to user settings. Similar descriptions are not repeated for this variation.

Figure 8:
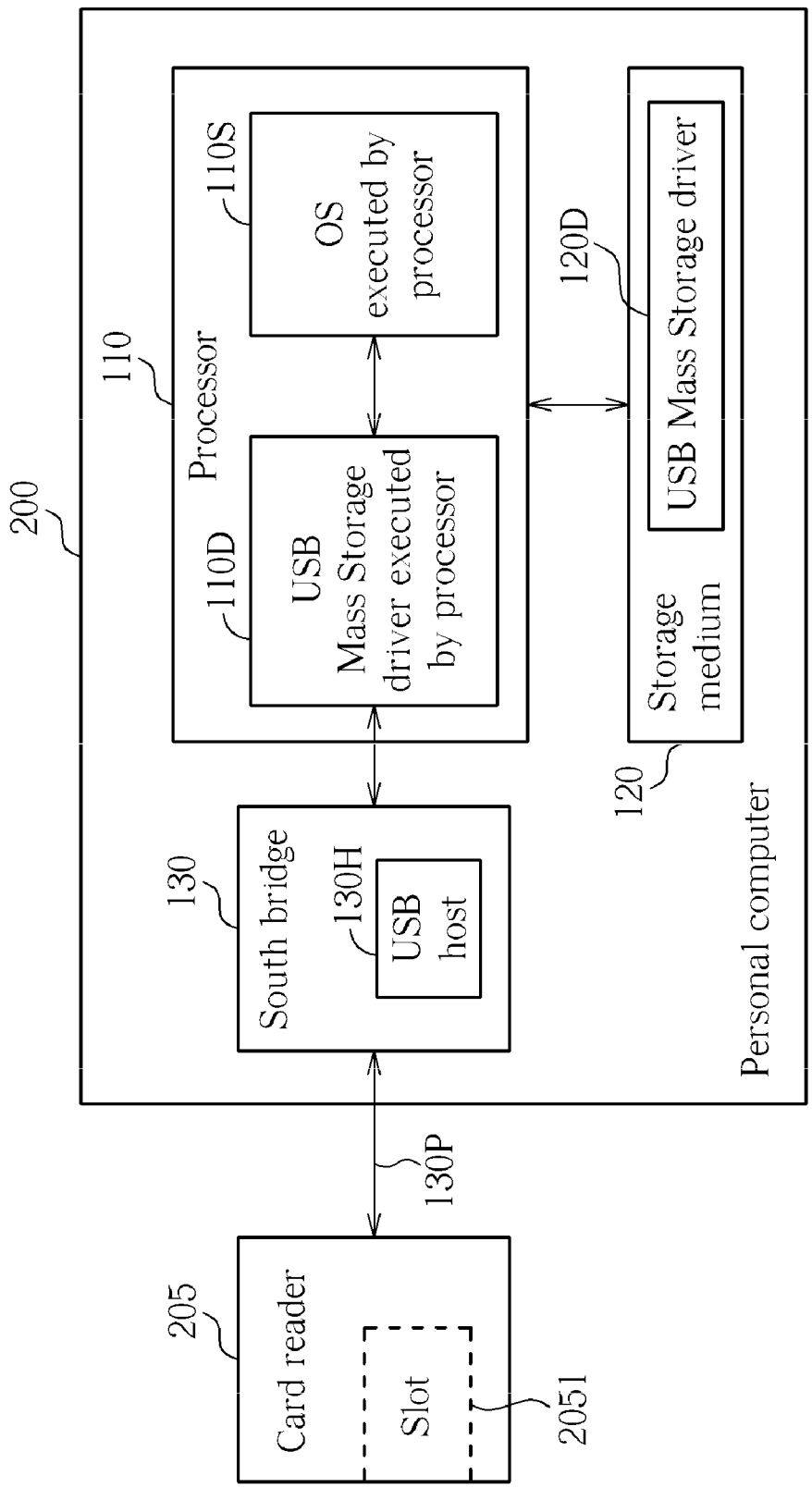
FIG. 8 is a diagram of a personal computer according to a second embodiment of the present invention, where the second embodiment is a variation of the first embodiment.

FIG. 8 is a diagram of a personal computer 200 according to a second embodiment of the present invention, where the second embodiment is a variation of the first embodiment.

Here, the aforementioned card reader 105 is replaced by another card reader 205 that is positioned outside the personal computer 200, where the user can detach the card reader 205 from the USB port 130P of the personal computer 200 when needed. In addition, the memory card slot 1051 mentioned above is replaced by a memory card slot 2051. Similar descriptions are not repeated for this embodiment.

In contrast to the related art, the present invention provides practical methods and associated USB Mass Storage drivers respectively corresponding to the methods. By utilizing the present invention methods or the associated USB Mass Storage drivers respectively corresponding to the methods, unnecessary icon display corresponding to the USB Mass Storage can be prevented.

It is another advantage of the present invention that, in a situation where the USB Mass Storage is a card reader comprising two or more memory card slots, the present invention methods and the associated USB Mass Storage drivers indeed enhance the icon display control corresponding to respective memory card slots since the user can see the icon of each non-empty memory card slot. By utilizing the present invention methods or the associated USB Mass Storage drivers respectively corresponding to the methods, the related error due to accessing an empty memory card slot (i.e. a memory card slot having nothing inserted therein) by clicking an icon of the empty memory card slot will never occur.

Those skilled in the art will readily observe that numerous modifications and alterations of the device and method may be made while retaining the teachings of the invention.

What is claimed is:

1. A method for controlling icon display corresponding to a Universal Serial Bus (USB) Mass Storage, the USB Mass Storage being electrically connected to a USB port of a personal computer, the method comprising:
    detecting any memory card insertion into the USB Mass Storage; and
    when it is detected that there is nothing inserted into any memory card slot of the USB Mass Storage, preventing the USB Mass Storage from triggering a specific icon to be displayed, wherein the specific icon is selectively utilized for indicating that at least one USB device is electrically connected to the personal computer;
wherein the personal computer further comprises a processor for executing an operating system (OS) and an USB Mass Storage driver; and the step of preventing the USB Mass Storage from triggering the specific icon to be displayed further comprises:
    when the USB Mass Storage detects that there is nothing inserted into any memory card slot of the USB Mass Storage, utilizing the USB Mass Storage driver to block a notifying signal sent from the USB Mass Storage to the OS.

2. The method of claim 1, further comprising:
    when it is detected that a memory card is inserted into any memory card slot of the USB Mass Storage, allowing the specific icon to be displayed.

3. The method of claim 1, further comprising:
    when it is detected that there is nothing inserted into a first memory card slot of the USB Mass Storage, preventing the USB Mass Storage from triggering a first icon to be displayed, wherein the first icon represents the first memory card slot or the USB Mass Storage.

4. The method of claim 3, wherein the USB Mass Storage comprises a plurality of memory card slots comprising the first memory card slot and a second memory card slot; and the method further comprises:
    when it is detected that there is nothing inserted into the second memory card slot, preventing the USB Mass Storage from triggering a second icon to be displayed, wherein the second icon represents the second memory card slot; and
    when it is detected that a memory card is inserted into the second memory card slot, allowing the second icon to be displayed.

5. The method of claim 1, wherein the step of detecting any memory card insertion into the USB Mass Storage further comprises:
    utilizing the OS to periodically send a test unit ready command to the USB Mass Storage for inquiring any memory card insertion.

6. The method of claim 1, wherein the USB Mass Storage is a card reader or a digital camera.

7. A personal computer, which comprises a storage medium storing a Universal Serial Bus (USB) Mass Storage driver for controlling icon display corresponding to a USB Mass Storage, the USB Mass Storage being electrically connected to a USB port of the personal computer, wherein when the USB Mass Storage driver is executed by the personal computer, the personal computer operates according to a method comprising:
    detecting any memory card insertion into the USB Mass Storage; and
    when it is detected that there is nothing inserted into any memory card slot of the USB Mass Storage, preventing the USB Mass Storage from triggering a specific icon to be displayed, wherein the specific icon is selectively utilized for indicating that at least one USB device is electrically connected to the personal computer;
wherein the personal computer further comprises a processor for executing an operating system (OS) and the USB Mass Storage driver; and the method further comprises:
    when the USB Mass Storage detects that there is nothing inserted into any memory card slot of the USB Mass Storage, utilizing the USB Mass Storage driver to block a notifying signal sent from the USB Mass Storage to the OS.

8. The personal computer of claim 7, wherein the method further comprises:
    when it is detected that a memory card is inserted into any memory card slot of the USB Mass Storage, allowing the specific icon to be displayed.

9. The personal computer of claim 7, wherein the method further comprises:
    when it is detected that there is nothing inserted into a first memory card slot of the USB Mass Storage, preventing the USB Mass Storage from triggering a first icon to be displayed, wherein the first icon represents the first memory card slot or the USB Mass Storage.

10. The personal computer of claim 9, wherein the USB Mass Storage comprises a plurality of memory card slots comprising the first memory card slot and a second memory card slot; and the method further comprises:
    when it is detected that there is nothing inserted into the second memory card slot, preventing the USB Mass Storage from triggering a second icon to be displayed, wherein the second icon represents the second memory card slot; and
    when it is detected that a memory card is inserted into the second memory card slot, allowing the second icon to be displayed.

11. The personal computer of claim 8, wherein the method further comprises:
    utilizing the OS to periodically send a test unit ready command to the USB Mass Storage for inquiring any memory card insertion.

12. The personal computer of claim 8, wherein the USB Mass Storage is a card reader or a digital camera.

13. The personal computer of claim 8, wherein the personal computer is a laptop computer.

14. A storage medium storing a Universal Serial Bus (USB) Mass Storage driver for controlling icon display corresponding to a USB Mass Storage, the USB Mass Storage being electrically connected to a USB port of a personal computer, wherein when the USB Mass Storage driver is executed by the personal computer, the personal computer operates according to a method comprising:
    detecting any memory card insertion into the USB Mass Storage; and
    when it is detected that there is nothing inserted into any memory card slot of the USB Mass Storage, preventing the USB Mass Storage from triggering a specific icon to be displayed, wherein the specific icon is selectively utilized for indicating that at least one USB device is electrically connected to the personal computer;
wherein the personal computer further comprises a processor for executing an operating system (OS) and the USB Mass Storage driver; and the method further comprises:
    when the USB Mass Storage detects that there is nothing inserted into any memory card slot of the USB Mass Storage, utilizing the USB Mass Storage driver to block a notifying signal sent from the USB Mass Storage to the OS.

15. The storage medium of claim 14, wherein the method further comprises:
    when it is detected that a memory card is inserted into any memory card slot of the USB Mass Storage, allowing the specific icon to be displayed.

16. The storage medium of claim 14, wherein the method further comprises:
    when it is detected that there is nothing inserted into a first memory card slot of the USB Mass Storage, preventing the USB Mass Storage from triggering a first icon to be displayed, wherein the first icon represents the first memory card slot or the USB Mass Storage.

17. The storage medium of claim 16, wherein the USB Mass Storage comprises a plurality of memory card slots comprising the first memory card slot and a second memory card slot; and the method further comprises:
    when it is detected that there is nothing inserted into the second memory card slot, preventing the USB Mass Storage from triggering a second icon to be displayed, wherein the second icon represents the second memory card slot; and
    when it is detected that a memory card is inserted into the second memory card slot, allowing the second icon to be displayed.

18. The storage medium of claim 14, wherein the method further comprises:
    utilizing the OS to periodically send a test unit ready command to the USB Mass Storage for inquiring any memory card insertion.

19. The storage medium of claim 14, wherein the USB Mass Storage is a card reader or a digital camera.

* * * * *